United States Patent
Rashid et al.

(10) Patent No.: US 10,430,356 B2
(45) Date of Patent: Oct. 1, 2019

(54) LOW OVERHEAD COPY ENGINE FAULT AND SWITCH MECHANISM

(71) Applicant: NVIDIA Corporation, Santa Clara, CA (US)

(72) Inventors: M. Wasiur Rashid, San Jose, CA (US); Jonathon Evans, Santa Clara, CA (US); Gary Ward, Santa Clara, CA (US); Philip Browning Johnson, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 14 days.

(21) Appl. No.: 15/582,459

(22) Filed: Apr. 28, 2017

(65) Prior Publication Data

US 2018/0314431 A1    Nov. 1, 2018

(51) Int. Cl.
  *G06F 3/06*       (2006.01)
  *G06F 13/28*     (2006.01)
  *G06F 12/109*   (2016.01)
  *G06F 13/40*     (2006.01)

(52) U.S. Cl.
  CPC .......... *G06F 13/28* (2013.01); *G06F 12/109* (2013.01); *G06F 13/4022* (2013.01); *G06F 2212/1041* (2013.01)

(58) Field of Classification Search
  CPC combination set(s) only.
  See application file for complete search history.

(56) References Cited

U.S. PATENT DOCUMENTS

| 9,575,892 B2 | 2/2017 | Deming et al. |
| 2015/0082001 A1* | 3/2015 | Duncan ............... G06F 12/1009 711/206 |

* cited by examiner

*Primary Examiner* — Yong J Choe
(74) *Attorney, Agent, or Firm* — Artegis Law Group, LLP

(57) ABSTRACT

Embodiments of the present invention set forth techniques for resolving page faults associated with a copy engine. A copy engine within a parallel processor receives a copy operation that includes a set of copy commands. The copy engine executes a first copy command included in the set of copy commands that results in a page fault. The copy engine stores the set of copy commands to the memory. At least one advantage of the disclosed techniques is that the copy engine can perform copy operations that involve source and destination memory pages that are not pinned, leading to reduced memory demand and greater flexibility.

20 Claims, 6 Drawing Sheets

LOW OVERHEAD COPY ENGINE FAULT AND SWITCH MECHANISM

BACKGROUND OF THE INVENTION

Field of the Invention

Embodiments of the present invention relate generally to computer processing systems, more particularly, to a low overhead copy engine fault and switch mechanism.

Description of the Related Art

A conventional copy engine, also referred to herein as a direct memory access (DMA) controller, is a hardware unit that copies data directly from one memory location to another memory location. A graphics processing unit (GPU) may include several such copy engines, where each copy engine is configured to transfer data from one memory location to another memory location.

For example, a copy engine within a GPU could copy data from a location within the frame buffer associated with the GPU to a location within the system memory associated with a central processing unit (CPU). Further, the copy engine could copy data from a location within the system memory of the CPU to a location in the frame buffer of the GPU. In another configuration, a copy engine within the GPU could copy data from the local GPU memory to the system memory, while a copy engine within the CPU could copy data from the system memory to the local GPU memory. In yet other configurations, the GPU could include one or more copy engines configured to copy data from one location in system memory to another location in system memory. Similarly, the one or more copy engines could be configured to copy data from one location in local GPU memory to another location in local GPU memory. Finally, the one or more copy engines could be configured to copy data between local GPU memory of a first GPU and remote GPU memory of a second GPU, as with a GPU peer-to-peer configuration. As a general matter, a device driver executing on either the CPU or the GPU manages the various operations performed by the copy engine(s) associated with the GPU.

In conventional implementations, copy engines and other types of DMA controllers typically operate only on memory pages that are "pinned." Pinned memory refers to memory pages within a virtual memory system that reside in physical memory and are allocated in a manner that prevents them (i.e., the memory pages) from being swapped out of physical memory by either the operating system or, in the case of virtual system implementations, the hypervisor. One drawback to limiting copy engine operations to pinned memory is that such an approach limits the ability of the virtual memory system to swap out or migrate memory pages in response to the memory requirements of the CPU and/or GPU, especially as those memory requirements change over time. Further, some programming models and virtualization systems require that the copy engine be able to access non-pinned memory.

Another drawback to conventional copy engine implementations is that traditional mechanisms for page fault handling may not be appropriate for handling page faults caused by the copy engine. More specifically, copy engines oftentimes perform copy operations where memory pages are being copied in response to a previous page fault caused by the CPU or the GPU. If a given copy engine itself causes a page fault and stalls during such a copy operation, then the virtual memory system may be substantially delayed in resolving the previous CPU or GPU page fault or, in the worst case, may never be able to resolve the previous CPU or GPU page fault.

One simple approach to handling page faults caused by a copy engine would be to snapshot the entire copy engine state when the copy engine causes a page fault. This snapshot of the copy engine state could then be written to memory. Once the copy engine page fault is resolved, the copy engine could retrieve the copy engine state from memory and continue operating from the snapshot point. However, this approach has certain drawbacks as well. First, because copy engines are heavily pipelined, the amount of state that may need to be saved to memory while a given page fault is resolved may be in the range of 80 kB to 500 kB per page fault. For copy engines that can by subject to large quantities of concurrent page faults, the total amount of storage space needed for storing the entire copy engine state may be in the range of one to two gigabytes (1-2 GB) or even more. Saving and restoring this much state can take a significant amount of time and substantially increase the associated memory overhead requirements. Second, the copy engine can process in excess of one hundred copy operations at any given time. Suspending one hundred or more in-flight copy operations and later restoring these operations at the exact point of suspension is technically complex and prone to failure.

As the foregoing illustrates, what is needed in the art are more effective approaches for performing copy operations via a copy engine.

SUMMARY OF THE INVENTION

Embodiments of the present invention set forth a computer-implemented method for resolving page faults associated with a copy engine. The method includes receiving, at the copy engine, a copy operation that includes a set of copy commands. The method further includes executing a first copy command included in the set of copy commands that results in a page fault. The method further includes storing the set of copy commands to the memory.

Other embodiments of the present invention include, without limitation, a parallel processing subsystem for performing one or more aspects of the disclosed techniques, as well as a system for performing one or more aspects of the disclosed techniques.

At least one advantage of the disclosed techniques is that the copy engine can perform copy operations that involve source and destination memory pages that are not pinned, leading to reduced memory demand and greater flexibility. Another advantage of the disclosed techniques is that amount of memory needed to store copy commands after a page fault is reduced relative to storing all of the state of the copy engine. For example, storing copy commands could require approximately 8 kilobytes of memory space versus approximately two gigabytes if the entire copy engine state were to be stored. Via the disclosed approaches, a copy engine is equipped to handle page faults and store copy commands for re-execution with low memory overhead and logic complexity relative to traditional page fault handling techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
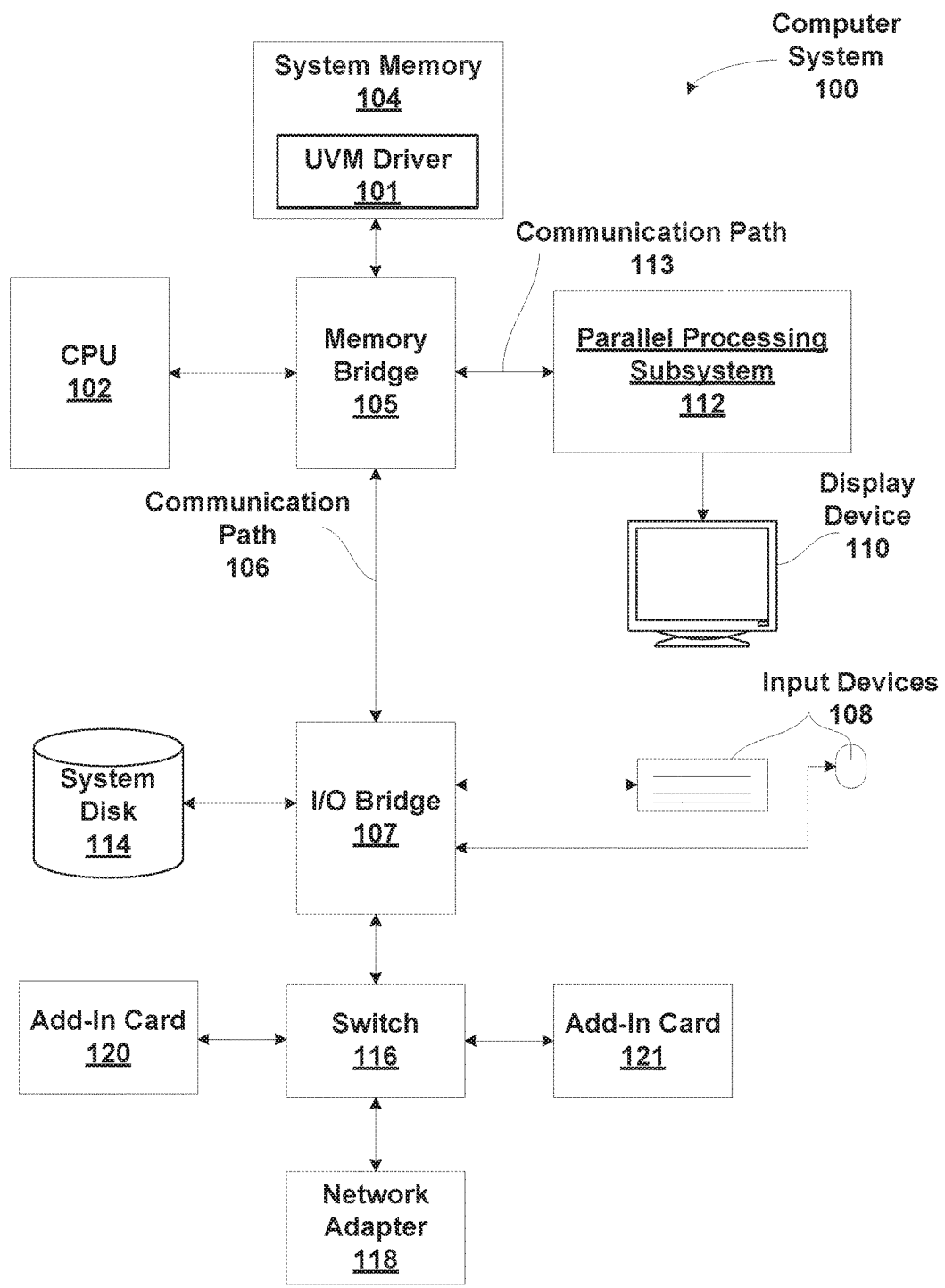
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in conjunction with FIGS. 2 and 3, such circuitry may be incorporated across one or more parallel processing units (PPUs), also referred to herein as parallel processors, included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In operation, CPU 102 is the master processor of computer system 100, controlling and coordinating operations of other system components. In particular, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

In some embodiments, system memory 104 includes a unified virtual memory (UVM) driver 101. The UVM driver 101 is a device driver that includes instructions for performing various tasks related to management of a unified virtual memory (UVM) system common to both the CPU 102 and the PPUs. Among other things, the architecture enables the CPU 102 and the PPU to access a physical memory location using a common virtual memory address, regardless of whether the physical memory location is within the system memory 104 or memory local to the PPU.

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
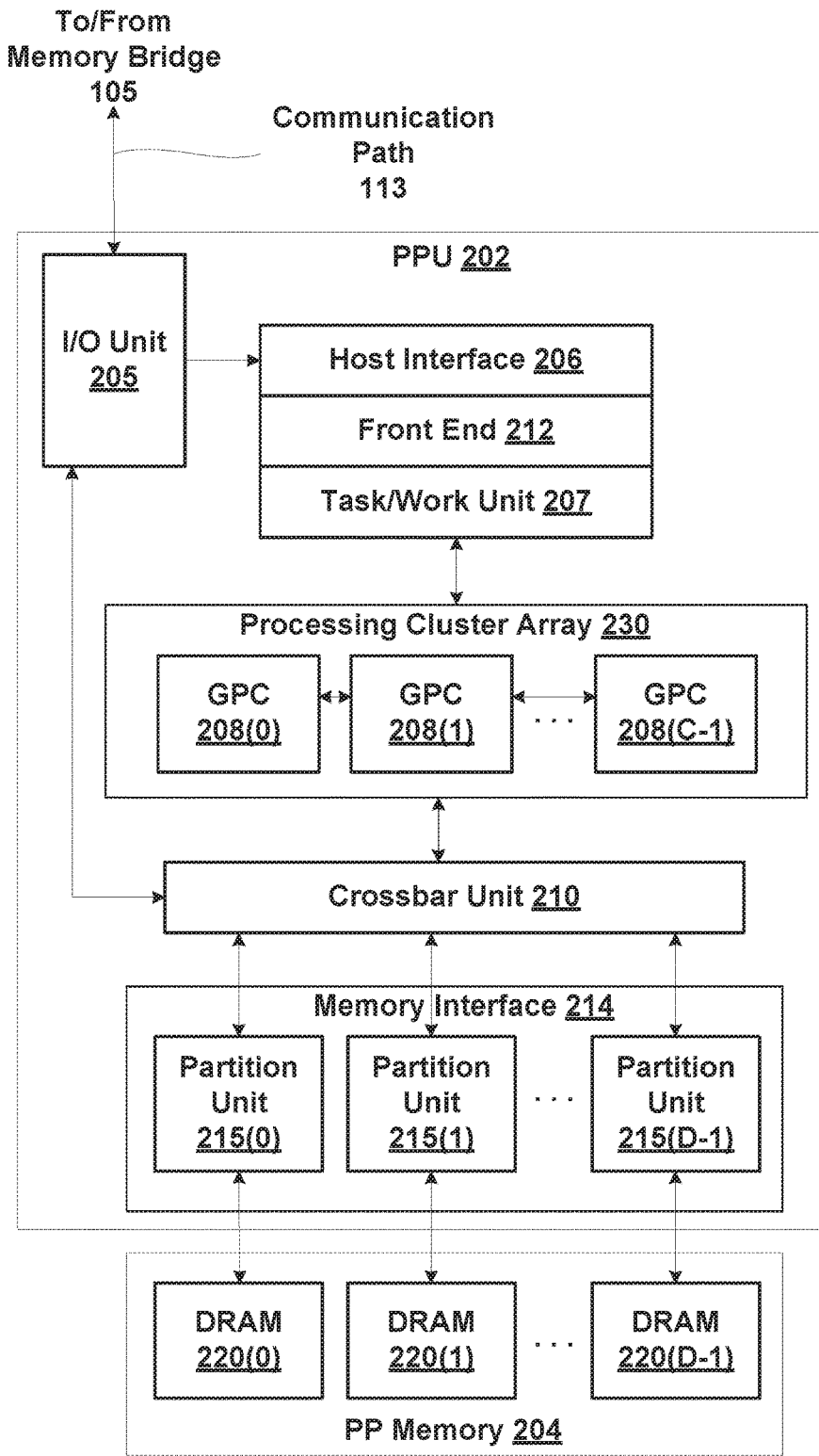
FIG. 2 is a block diagram of a parallel processing unit included in the parallel processing subsystem of FIG. 1, according to various embodiments of the present invention.

FIG. 2 is a block diagram of a parallel processing unit (PPU) 202 included in the parallel processing subsystem 112 of FIG. 1, according to various embodiments of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a command queue, also referred to herein as a pushbuffer, to initiate processing of the stream of commands in the data structure. The PPU 202 reads command streams from the command queue and then executes commands asynchronously relative to the operation of CPU 102. In embodiments where multiple command queues are generated, execution priorities may be specified for each command queue by an application program to control scheduling of the different command queues. In some embodiments, the execution priorities may be specified for each command queue by the application program via UVM driver 101 or via any other technically feasible driver.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each command queue and transmits the command stream stored in the command queue to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a command queue and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In some embodiments, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In some embodiments, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Unified Virtual Memory System with Copy Engine Fault and Switch Mechanism

Figure 3A:
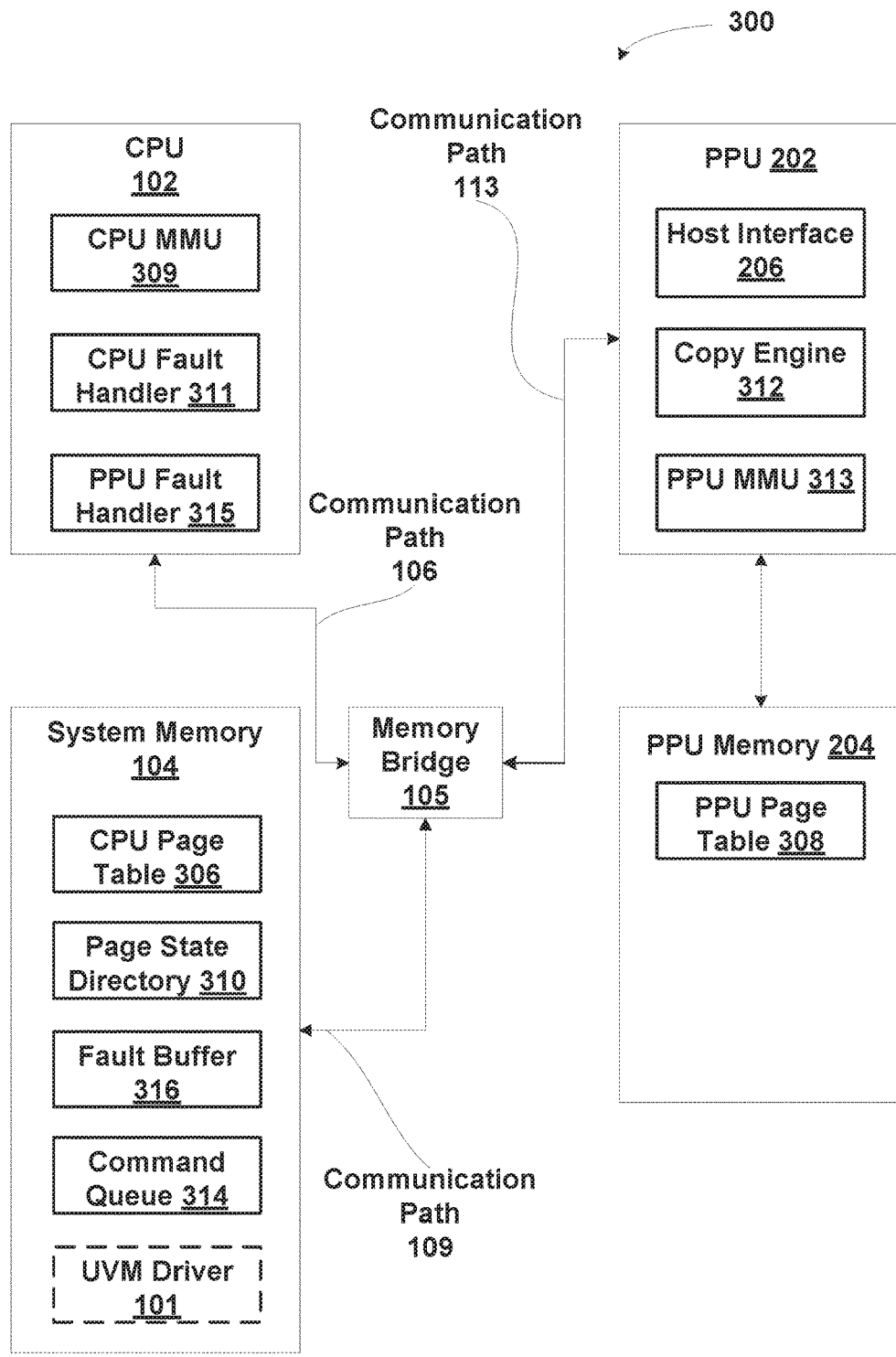
FIG. 3A is a block diagram illustrating a unified virtual memory (UVM) system included in the computer system of FIG. 1, according to various embodiments of the present invention.

FIG. 3A is a block diagram illustrating a unified virtual memory (UVM) system 300 included in the computer system 100 of FIG. 1, according to various embodiments of the present invention. As shown, the unified virtual memory system 300 includes, without limitation, the CPU 102, the system memory 104, and the parallel processing unit (PPU) 202 coupled to the PP memory 204. The CPU 102 and the system memory 104 are coupled to each other and to the PPU 202 via the memory bridge 105.

The CPU 102 executes threads that may request data stored in the system memory 104 or the PP memory 204 via a virtual memory address. Virtual memory addresses shield threads executing in the CPU 102 from knowledge about the internal workings of a memory system. Thus, a thread may only have knowledge of virtual memory addresses, and may access data by requesting data via a virtual memory address.

The CPU 102 includes a CPU MMU 309, which processes requests from the CPU 102 for translating virtual memory addresses to physical memory addresses. The physical memory addresses are required to access data stored in a physical memory unit such as the system memory 104 and the PP memory 204. The CPU 102 includes a CPU fault handler 311, which executes steps in response to the CPU MMU 309 generating a page fault, to make requested data available to the CPU 102. The CPU fault handler 311 is generally software that resides in the system memory 104 and executes on the CPU 102, the software being provoked by an interrupt to the CPU 102.

The system memory 104 stores various memory pages (not shown) that include data for use by threads executing on the CPU 102 or the PPU 202. As shown, the system memory 104 stores a CPU page table 306, which includes mappings between virtual memory addresses and physical memory addresses. The system memory 104 also stores a page state directory 310, which acts as a "master page table" for the UVM system 200, as is discussed in greater detail below. The system memory 104 stores a fault buffer 316, which includes entries written by the PPU 202 in order to inform the CPU 102 of a page fault generated by the PPU 202. In some embodiments, the system memory 104 includes the unified virtual memory (UVM) driver 101, which includes instructions that, when executed, cause the CPU 102 to execute commands for, among other things, remedying a page fault. In alternative embodiments, any combination of the page state directory 310, the fault buffer 316, and one or more command queues 314 may be stored in the PP memory 204. Further, a PPU page table 308 may be stored in the system memory 104.

In a similar manner as with the CPU 102, the PPU 202 executes instructions that may request data stored in the system memory 104 or the PP memory 204, via a virtual memory address. The PPU 202 includes a PPU MMU 313, which processes requests from the PPU 202 for translating virtual memory addresses to physical memory addresses. The PPU 202 includes a copy engine 312, which executes copy operations that are stored in the command queue 314. The copy operations include copy commands for copying memory pages, modifying data in the PPU page table 308, and other commands, as further described herein. In general, the copy engine receives copy operations, via the host interface 206, from the UVM driver 101 executing on the CPU 102. In various embodiments, some copy requests may result from a page fault that occurs when the CPU or the GPU accesses a memory page that is not resident in physical memory that is accessible by the CPU or the GPU, respectively. Other copy requests may be issued by other software programs, including, without limitation, the operating system, a virtual machine hypervisor, or a software application program. The copy requests may include instructions to convert the data from one format to another when copying the data from the source memory location to the destination memory location.

Although a single copy engine 312 is illustrated in FIG. 3, the PPU 202 may include any number of copy engines within the scope of the present invention. A PPU fault handler 315 executes steps in response to a page fault on the PPU 202. The PPU fault handler 315 can be software running a processor or dedicated microcontroller in the PPU 202, or the PPU fault handler 315 can be software running on the CPU 102, with the latter being the preferred choice. In some embodiments, the CPU fault handler 311 and the PPU fault handler 315 can be a unified software program that is invoked by a fault on either the CPU 102 or the PPU 202. The command queue 314 may be in either the PP memory 204 or the system memory 104, but is preferentially located in the system memory 104.

In some embodiments, the CPU fault handler 311 and the UVM driver 101 may be a unified software program. In such cases, the unified software program may be software that resides in the system memory 104 and executes on the CPU 102. The PPU fault handler 315 may be a separate software program running on a processor or dedicated microcontroller in the PPU 202, or the PPU fault handler 315 may be a separate software program running on the CPU 102.

In other embodiments, the PPU fault handler 315 and the UVM driver 101 may be a unified software program. In such cases, the unified software program may be software that resides in the system memory 104 and executes on the CPU 102. The CPU fault handler 311 may be a separate software program that resides in the system memory 104 and executes on the CPU 102.

In other embodiments, the CPU fault handler 311, the PPU fault handler 315, and the UVM driver 101 may be a unified software program. In such cases, the unified software program may be software that resides in the system memory 104 and executes on the CPU 102.

In some embodiments, the CPU fault handler 311, the PPU fault handler 315, and the UVM driver 101 may all reside in system memory 104, as described above. As shown in FIG. 2, the UVM driver 101 resides in system memory 104, while the CPU fault handler 311 and the PPU fault handler 315 reside in the CPU 102.

The CPU fault handler 311 and the PPU fault handler 315 are responsive to hardware interrupts that may emanate from the CPU 102 or the PPU 202, such as interrupts resulting from a page fault. As further described below, the UVM driver 101 includes instructions for performing various tasks related to management of the UVM system 200, including, without limitation, remedying a page fault, and accessing the CPU page table 306, the page state directory 310, the command queue 314, and/or the fault buffer 316.

In some embodiments, the CPU page table 306 and the PPU page table 308 have different formats, and contain different information; for example, the PPU page table 308 may contain the following while the CPU page table 306 does not: atomic disable bit; compression tags; and memory swizzling type.

In a similar manner as with the system memory 104, the PP memory 204 stores various memory pages (not shown). As shown, the PP memory 204 also includes the PPU page table 308, which includes mappings between virtual memory addresses and physical memory addresses. Alternatively, the PPU page table 308 may be stored in the system memory 104.

In operation, the UVM driver 101 executing on the CPU 102 receives various copy requests to copy data from a source memory location to a destination memory location. In various embodiments, some copy requests may result from a page fault that occurs when the CPU or the GPU accesses a memory page that is not resident in physical memory that is accessible by the CPU or the GPU, respectively. Other copy requests may be issued by other software programs, including, without limitation, the operating system, a virtual machine hypervisor, or a software application program. The copy requests may include instructions to convert the data from one format to another when copying the data from the source memory location to the destination memory location.

The UVM driver 101 converts the copy requests into a stream of copy operations, where each copy operation includes a set of commands directed to the copy engine 312. In this manner, the UVM driver generates a stream of copy operations and transmits the stream of copy operations to the copy engine 312. The copy operations are transmitted to the copy engine 312 via a channel, where a channel is a thread of execution associated with a particular copy engine 312. Each channel is associated with a specific command queue 314. In general, the UVM driver 101 stores the stream of copy operations in a command queue 314 in memory, and passes the address of the command queue 314 to the copy engine 312 via the host interface 206. The copy engine 312 retrieves the copy operations from the command queue 314 and executes the copy operations in the order that the copy operations appear in the command queue 314.

Each copy operation includes a set of one or more copy commands, also referred to herein as "methods." The copy commands include instructions for specifying various parameters associated with the corresponding copy operation, including, without limitation, the size, source address, destination address, and type of data being copied. In some embodiments, the copy commands may include instructions to convert the data from the source address to a different data format prior to storing the data at the destination address. The copy commands may also include a command to wait for a semaphore or other resource lock to be released prior to performing the copy operation. Typically, the host interface 206 acquires the semaphore or other resource lock and inserts a corresponding copy command into an appropriate place in the copy operation. The copy engine 312 is thereby instructed to wait for the semaphore or other resource lock to be released. The final copy command in a given copy operation is typically a copy command that triggers the copy operation to begin.

Upon receiving the copy commands for a particular copy operation, the copy engine 312 converts the copy commands into internal states, where the internal states control the registers and state machine within the copy engine 312 in order to complete the copy operation. These internal states direct the copy engine 312 to read, or load, the data stored at the source address and copy the data by writing, or storing, the data at the destination address, according to the specified size and data type. The copy engine 312 processes the copy commands in order, one by one, thereby completing a corresponding copy operation. Likewise, the copy engine 312 processes the copy operations in order, one by one, thereby completing a stream of copy operations received from the UVM driver 101 in the order that the copy operations were received by the UVM driver.

Figure 3B:
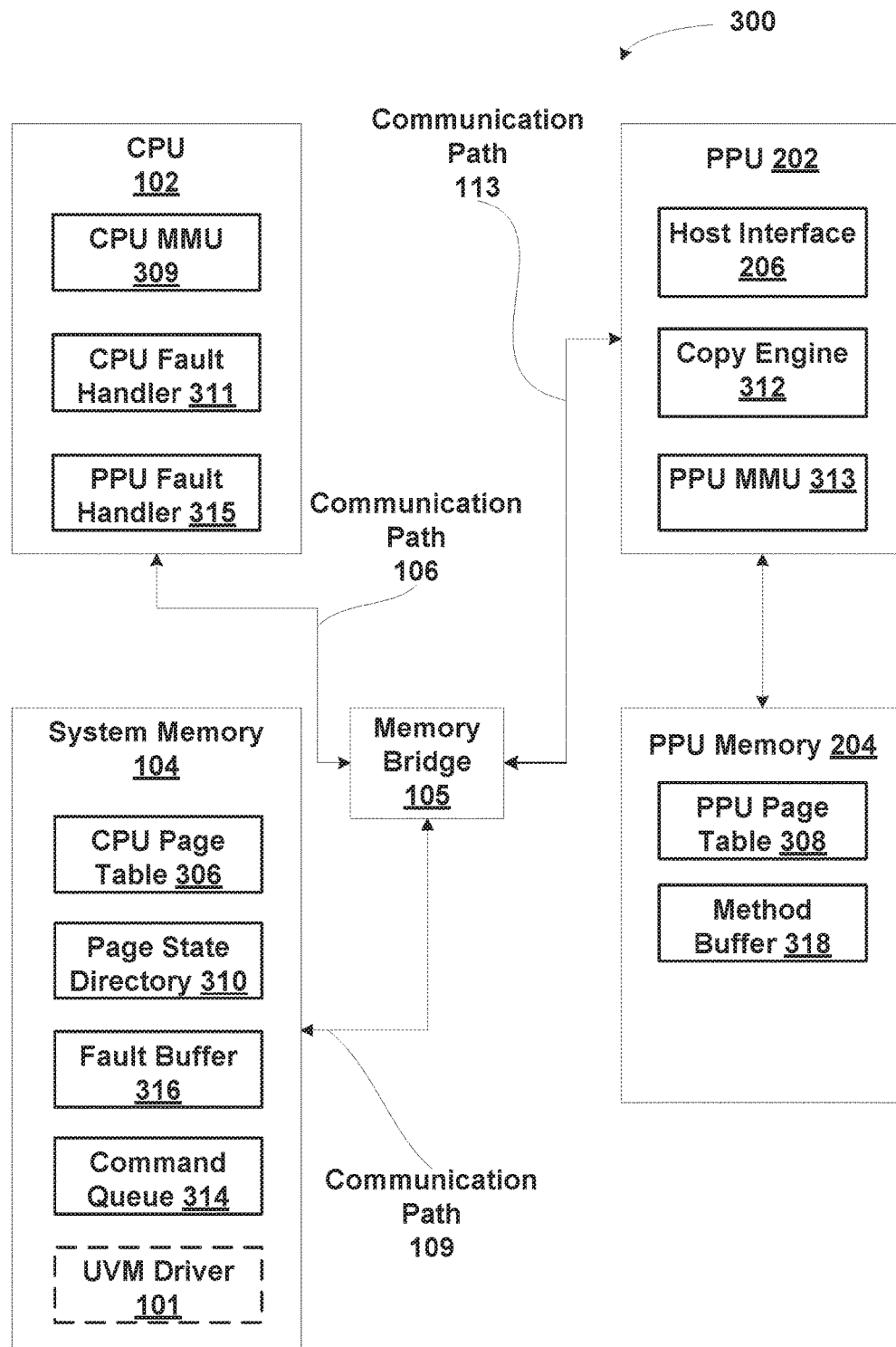
FIG. 3B is a block diagram illustrating another unified virtual memory (UVM) system included in the computer system of FIG. 1, according to various embodiments of the present invention.

FIG. 3B is a block diagram illustrating another unified virtual memory (UVM) system 300 included in the computer system 100 of FIG. 1, according to various embodiments of the present invention. As shown, the unified virtual memory system 300 includes, without limitation, the CPU 102, the system memory 104, and the parallel processing unit (PPU) 202 coupled to the PP memory 204. The CPU 102 and the system memory 104 are coupled to each other and to the PPU 202 via the memory bridge 105. The CPU 102, the system memory 104, the PPU 202, the PP memory 204, and the memory bridge 105 function substantially the same as described in conjunction with FIG. 3A except as further described below.

As described in conjunction with FIG. 3A, the copy engine 312 is pipelined in order to hide the latency between reading the data at the source address and writing the data to the destination address. In this manner, the copy engine 312 issues a number of read commands directed to source addresses associated with one or more copy operations. As the copy engine 312 receives read data from in-flight copy operations, the copy engine 312 writes the received data to the appropriate destination addresses while continuing to issue read commands associated with subsequent copy operations. As a result, the copy engine 312 may contain state information associated with dozens or even hundreds of in-flight copy operations.

The total amount of state stored in the copy engine at any given time may be in significantly large. In one example, the copy engine 312 could by capable of processing copy operations for up to 4,096 at any given time. The amount of state for one of these channels could be in the range of 80 kB to 500 kB. If all of the state information were to be stored for a channel that causes a page fault, then the copy engine 312 would store 80 kB to 500 kB of state information for each channel that causes a page fault. In the worst case, all 4,096 channels being processed by the copy engine 312 could concurrently cause a page fault. Given the amount of state information for each channel, the memory space needed for storing the entire state of the copy engine 312 would be 4,096 channels times 80 kB to 500 kB per channel, or 320 MB to 2 GB.

In general, the copy engine 312 completes each copy operation in turn, in the order that the copy operations are received from the UVM driver 101. Each copy operation instructs the copy engine 312 to copy data from a source location in memory space to a destination location in memory space. The source location may be specified as a virtual memory address or a physical memory address. Likewise, the destination location may be specified as a virtual memory address or a physical memory address. Each copy operation may be of any technically feasible size. The source location and the destination location may be in system memory 104, PPU memory 204, or in any other technically feasible memory in any combination, within the scope of the present invention. For copy operations involving virtual memory addresses, the copy engine 312, in conjunction with the PPU MMU 313, translates the virtual memory addresses associated with each copy operation to physical memory locations. The copy engine 312 then performs the copy operation by copying data from the equivalent source location in physical memory space to the equivalent destination location in physical memory space.

The copy engine accesses each virtual memory page during a copy operation via the PPU MMU 313. If the copy engine 312 directs a read command or a write command to a virtual memory page that is resident in physical memory, the PPU MMU 313 returns a positive acknowledge (ACK) to the copy engine 312, and the read command or write command completes properly. If the copy engine 312 directs a read command or a write command to a virtual memory page that is not resident in physical memory, the PPU MMU 313 returns a negative acknowledge (NACK) to the copy engine 312, resulting in a page fault. The PPU MMU 313 reports the page fault to the UVM driver 101. As copy operations execute, the copy engine 312 keeps track of the earliest non-committed copy operation. The copy engine 312 waits until all copy operations after the earliest non-committed copy operation and preceding the faulting copy operation are committed to complete. A copy operation is committed to complete if the copy operation has not generated any page faults and the PPU MMU 313 has returned ACKs for all relevant virtual memory pages.

The copy engine 312 then writes the copy commands associated with the faulting copy operation to a method buffer 318 in any technically feasible memory, including, without limitation, system memory 104 and PPU memory 204. In some embodiments, the method buffer 318 may include all or part of the command queue 314. The copy engine 312 then writes the copy commands associated with copy operations that follow the faulting copy operation to the method buffer 318. In some embodiments, the method buffer 318 may reside in pinned memory so that the copy engine 312 does not cause a page fault when writing copy operations to the method buffer 318 or subsequently retrieving the copy commands from the method buffer 318. In general, user application programs are prevented from directly access the method buffer 318 in order to prevent unauthorized altering of copy commands. Typically, each copy operation includes approximately 8 to 26 copy commands, and the total memory space needed to store the copy operations for a particular channel may be in the range of 4-12 kilobytes.

After writing the copy operations to the method buffer 318, the copy engine 312 reports the page fault to the host interface 206, along with an identifier that specifies the channel associated with the faulting copy operation. In response, the host interface 206 marks the specified channel as faulted and stops scheduling new copy operations for the specified channel to the copy engine 312. The host interface 206 is free to schedule copy operations associated with other channels for execution on the copy engine 312. Meanwhile, the UVM driver resolves the page fault, possibly by employing one or more copy engines 312. When the UVM driver 101 reports that the page fault is resolved, the host interface 206 marks the faulted channel as not faulted. The host interface 206 transmits a context load request to the copy engine 312, thereby binding the copy engine 312 to the channel and the PPU MMU 313. The context load request includes an identifier of the channel associated with the page fault along with a fault flag that indicates that the channel had previously faulted. The context load request further includes: (1) information regarding the virtual address space associated with the channel; and (2) an address pointer that identifies the location of the method buffer 318 that includes the faulting copy operation along with additional copy operations that follow the faulting copy operation. The fault flag indicates that the copy operations in the method buffer 318 should be executed prior to executing new copy operations received from the UVM driver 101.

The host interface 206 then begins scheduling new copy operations to the copy engine 312. In general, the host interface 206 issues new copy operations for the same channel that previously caused the page fault. Alternatively, in some embodiments, all remaining copy operations for the previously faulted channel may have been issued to the copy engine 312 prior to the page fault. As a result, all remaining copy operations for the previously faulted channel may be included in the method buffer 318. In such embodiments, the host interface 206 may not need to issue any new copy operations associated with the previously faulted channel. Therefore, the host interface 206 may issue a new context load request followed by new copy operations for a different channel once all copy operations retrieved from the method buffer 318 complete. If the host interface 206 determines that no channel has outstanding copy operations in need of processing, then the host interface 206 does not issue any new copy operations to the copy engine 312.

In response to receiving the context load request including the fault flag, the copy engine 312 retrieves the copy operations from the method buffer 318, and re-executes the copy operation that caused the fault. The copy engine 312 then executes the copy operations that follow the copy operation that caused the fault. After executing the retrieved copy operations, the copy engine 312 then executes new copy operations received from the UVM driver 101 and stored in command queue 314. In general, even though at least a portion of the faulting copy operation is executed more than once, data integrity and other potential coherency issues do not result so long as all copy operations for a particular channel are executed in the same order that the copy operations were received from the UVM driver 101.

With the techniques described herein, the copy engine 312 executes copy operations directed to virtual memory pages that are unpinned. Because the copy engine 312 is able to recover from page faults, the command queue 314 that contains the copy operations for the copy engine 312 may likewise reside in virtual memory pages that are unpinned. If a page fault results from accessing the command queue 314, then the page fault may be remedied via the techniques as further described herein.

In some embodiments, copy operations may be executed by the copy engine 312 in conjunction with a copy splitting feature. A particular copy operation may involve copying several gigabytes of data from the source address to the destination address. If such a copy operation causes a page fault, the entire copy operation may need to be re-executed, even if the page fault occurs near the end of the copy operation. In order to mitigate the effect of a page fault occurring during a large copy operation, the host interface 206 may split such copy operations into multiple smaller copy operations. For example, the host interface 206 could receive a copy operation from the UVM driver 101 with a size parameter of 1 gigabyte. In such cases, the host interface 206 would split the copy operation into smaller copy operations, such as 131,072 8 KB copy operations. The host interface 206 would then transmit the smaller copy operations to the copy engine 312. In some embodiments, the UVM driver 101 executing on the CPU 102 may split the copy operation into smaller copy operations and may transmit the smaller copy operations to the copy engine 312, rather than the host interface 206. If one of these smaller copy operations causes a page fault in the copy engine 312, only the copy operation causing the page fault and any subsequent copy operations would be re-executed. Copy operations that started and were committed to complete prior to the faulting copy operation would not be replayed. Thus, in the above example, the entire 1 GB copy operation would not have to be re-executed. Further, the copy engine 312 executes a copy operation without page faulting if all virtual memory pages associated with the copy operation are resident in physical memory at the same time. In the example above, by splitting a 1 gigabyte copy operation into smaller 8 kilobyte copy operations, only the 8 kilobytes associated with the current copy operation need to be resident in physical memory, rather than the entire 1 gigabyte associated with the original copy operation.

It will be appreciated that the system shown herein is illustrative and that variations and modifications are possible. The UVM system 300 is illustrated with a single CPU 102, PPU 202, system memory 104, and PPU memory 204. However, the UVM system 300 may include any technically feasible number of CPUs 102, PPUs 202, system memories 104, and PPU memories 204 within the scope of the present invention. In such UVM systems 300, any copy engine 312 residing on any PPU 202 may read data from any system memory 104 or PPU memory 204 and copy the data to the same memory or to any other system memory 104 or PPU memory 204.

Figure 4A:
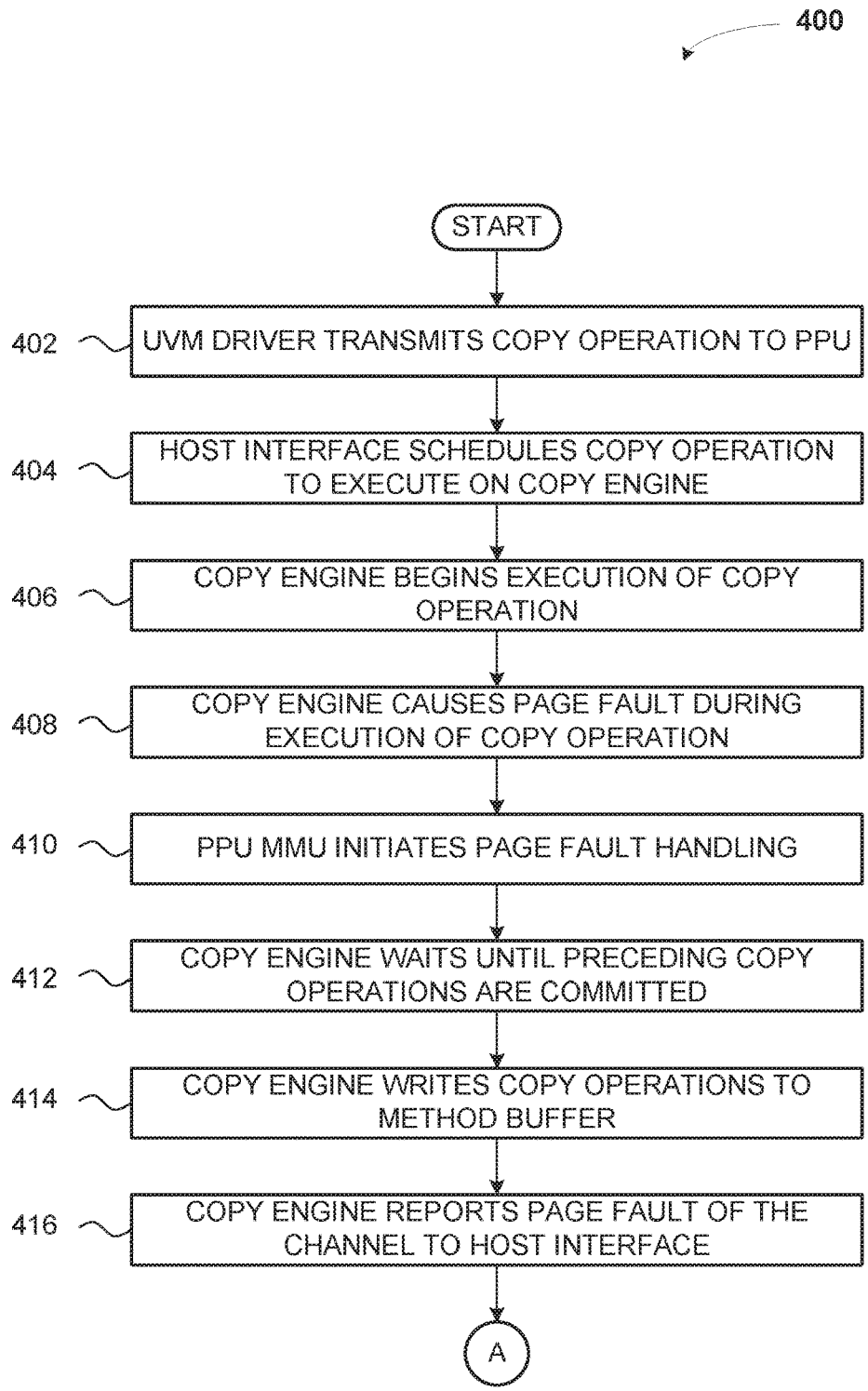
FIGS. 4A-4B set forth a flow diagram of method steps for handling memory page faults generated by a copy engine, according to various embodiments of the present invention.
Figure 4B:
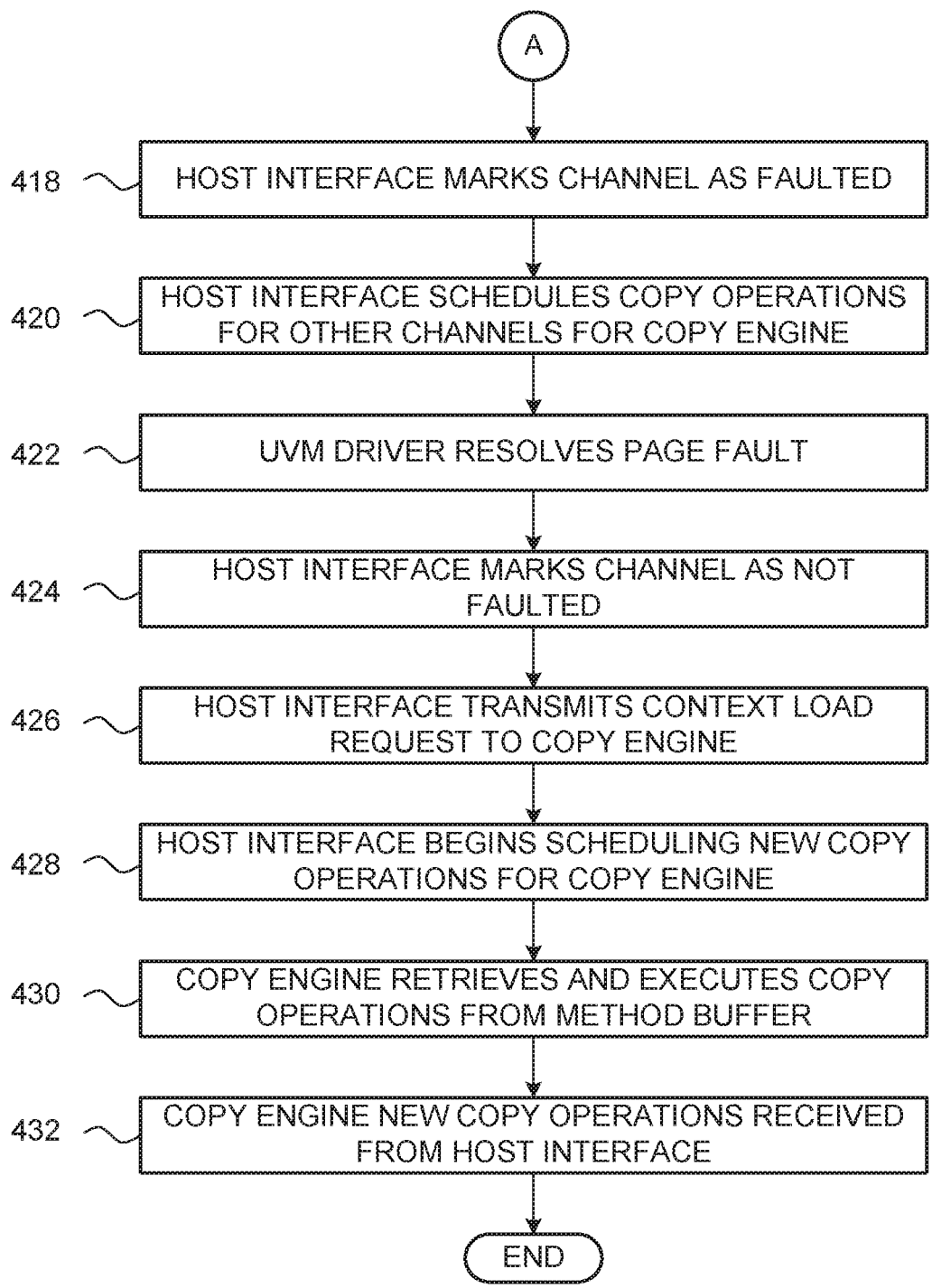

FIGS. 4A-4B set forth a flow diagram of method steps for handling memory page faults generated by a copy engine, according to various embodiments of the present invention. Although the method steps are described in conjunction with the systems of FIGS. 1-4, persons skilled in the art will understand that any system configured to perform the method steps, in any order, is within the scope of the present invention.

As shown, a method 400 begins at step 402, where a UVM driver 101 executing on a CPU 102 transmits a copy operation to a PPU 202. In some embodiments, the UVM driver 101 writes one or more copy commands associated with the copy operation in a command queue 314. The UVM driver 101 then transmits a pointer that includes the memory address of the command queue 312 to the PPU 202.

At step 404, a host interface 206 within the PPU 202 schedules the copy operation to be executed by a copy engine 312 within the PPU 202. In some embodiments, the host interface 206 may split large copy operations into multiple smaller copy operations. In such embodiments, the host interface 206 may replace the copy operation stored in the command queue 314 with the smaller copy operations resulting from the split operation. The host interface 206 then directs the copy engine 312 execute the copy operations stored in the command queue 314.

At step 406, the copy engine 312 begins execution of the copy operations by reading the copy commands included in the copy operations stored in the command queue 314. During execution of the copy operations, the copy engine 312 executes read commands to read data from the source address of the copy operation. Further, the copy engine 312 executes write commands to write the data to the destination address of the copy operation. In some embodiments, the copy engine 312 may execute additional commands related to the copy operation, including, without limitation, converting the data from one data format to another data format and waiting for a semaphore or other resource lock to be released. In the case of a semaphore or other resource lock, the host interface 206 typically acquires the semaphore or other resource lock and inserts a corresponding copy command into an appropriate place in the copy operation. The host interface 206 thereby instructs the copy engine 312 to wait for the semaphore or other resource lock to be released.

At step 408, the copy engine 312 causes a page fault by reading from or writing to a virtual memory address that is not resident in memory. At step 410, the PPU MMU 313 initiates page fault handling by transmitting a negative acknowledge (NACK) to the copy engine 312. Further, the PPU MMU 313 reports the page fault to the UVM driver 101. At step 412, the copy engine 312 waits until all copy operations after the earliest non-committed copy operation and preceding the faulting copy operation are committed to complete. A copy operation is committed to complete if the copy operation has not generated any page faults and the PPU MMU 313 has returned ACKs for all relevant virtual memory pages.

At step 414, the copy engine 312 writes the copy commands associated with the faulting copy operation to a method buffer 318. The copy engine 312 then writes the copy commands associated copy operations that follow the faulting copy operation to the method buffer 318. At step 416, the copy engine 312 reports the page fault to the host interface 206, along with an identifier that specifies the channel associated with the faulting copy operation. At step 418, the host interface 206 marks the specified channel as faulted and stops scheduling new copy operations for the specified channel to the copy engine 312. At step 420, the host interface 206 schedules copy operations associated with other channels for execution on the copy engine 312. At step 422, the UVM driver resolves the page fault, possibly by employing one or more copy engines 312. The UVM driver 101 then reports that the page fault is resolved. At step 424, the host interface 206 marks the faulted channel as not faulted. At step 426, the host interface 206 transmits a context load request to the copy engine 312, thereby binding the copy engine 312 to the channel and the PPU MMU 313. The context load request includes an identifier of the channel associated with the page fault along with a fault flag that indicates that the channel had previously faulted. The context load request further includes: (1) information regarding the virtual address space associated with the channel; and (2) an address pointer that identifies the location of the method buffer 318 that includes the faulting copy operation along with additional copy operations that follow the faulting copy operation. The fault flag indicates that the copy operations in the method buffer 318 should be executed prior to executing new copy operations received from the UVM driver 101.

At step 428, the host interface 206 begins scheduling new copy operations to the copy engine 312. The host interface 206 may issue new copy operations for the previously faulted channel. Alternatively, if all copy operations associated with the previously faulted channel are included in the method buffer 318, then the host interface 206 may issue new copy operations for a different channel than the previously faulted channel.

At step 430, the copy engine 312 retrieves the copy operations from the method buffer 318, and re-executes the copy operation that caused the fault. The copy engine 312 then executes the copy operations that follow the copy operation that caused the fault. At step 432, after executing the retrieved copy operations, the copy engine 312 then executes new copy operations received from the UVM driver 101 and stored in the method buffer 318 or command queue 314. In general, even though at least a portion of the faulting copy operation is executed more than once, data integrity and other potential coherency issues do not result so long as all copy operations for a particular channel are executed in the same order that the copy operations were received from the UVM driver 101.

The method 400 then terminates.

In sum, a copy engine associated with a particular channel includes a fault and switch mechanism that allows the copy engine to replay copy operations for handling page faults caused by the copy engine. To perform a copy operation, the copy engine receives a set of copy commands from the CPU via a UVM driver. Upon the occurrence of a copy engine page fault, the copy engine completes all copy operations that started prior to the faulting copy operation. The copy engine saves the methods for the faulting copy operation and any subsequent copy operations received from the host to a method buffer in memory. The method buffer is organized on a per-context and per-run-queue basis. No other copy engine internal state is saved to memory. Once the methods are saved, the copy engine reports the page fault to the CPU, and the CPU is able to schedule new work from a different context on the copy engine.

The CPU keeps track of the page fault status for each saved set of methods and does not reschedule a particular set of methods until the corresponding page fault status is cleared after servicing the page fault. Once a saved set of methods is rescheduled, the CPU instructs the copy engine to reload the previously saved set of methods for re-execution. More specifically, the UVM driver executing on the CPU re-enables the faulted channel after the page fault has been properly serviced. Once the faulted channel is re-enabled, a host interface subsequently reschedules the channel and instructs the copy engine to reload the saved methods. The copy engine then restores the saved methods (including the methods for the copy operation that caused the fault) and executes the restored methods before processing new methods from the CPU, thereby preserving execution order of the methods. Because only the methods are saved and restored, rather than the entire copy engine state, the copy engine replays entire copy operations at a time, starting with the copy operation that caused the page fault.

At least one advantage of the disclosed techniques is that the copy engine can perform copy operations that involve source and destination memory pages that are not pinned, leading to reduced memory demand and greater flexibility. Another advantage of the disclosed techniques is that amount of memory needed to store copy commands after a page fault is reduced relative to storing all of the state of the copy engine. For example, storing copy commands could require approximately 8 kilobytes of memory space per faulted channel. By contrast, the amount of state that may need to be saved to memory while a given page fault is resolved may be in the range of 80 kB to 500 kB per page fault. For copy engines that can by subject to large quantities of concurrent page faults, the total amount of storage space needed for storing the entire copy engine state may be in the range of one to two gigabytes (1-2 GB) or even more. Via the disclosed approaches, a copy engine is equipped to handle page faults and store copy commands for re-execution with low memory overhead and logic complexity relative to traditional page fault handling techniques.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A parallel processor, comprising:
a memory management unit; and
a copy engine coupled to the memory management unit, wherein the copy engine:
  receives a first copy operation included in a plurality of copy operations that includes a first set of copy commands;
  executes, by the copy engine, a first copy command included in the first set of copy commands;
  receives an acknowledgement from the memory management unit indicating that the first copy command caused a page fault;
  stores the first set of copy commands to the memory including the first copy command that caused the page fault;
  after the page fault has been resolved, loads the first set of copy commands from the memory; and
  re-executes, by the copy engine, the first copy command.

2. The parallel processor of claim 1, wherein the copy engine further receives, from a host interface, a plurality of copy operations that includes the first copy operation, wherein an original copy operation has been split by the host interface into the plurality of copy operations.

3. The parallel processor of claim 1, wherein an original copy operation associated with a first memory range has been split into the plurality of copy operations, and each copy operation included in the plurality of copy operations is associated with a different memory range that is smaller than the first memory range.

4. The parallel processor of claim 1, wherein the copy engine further:
  receives, from a host interface, a context load request associated with the first copy operation;
  wherein the first set of copy commands is loaded and the first copy command is re-executed in response to receiving the context load request.

5. The parallel processor of claim 4, wherein the first copy operation is associated with a first channel, and wherein the copy engine further:
  receives a second copy operation included in the plurality of copy operations that includes a second set of copy commands, wherein the second copy operation is associated with a second channel; and
  executes, by the copy engine, a second copy command included in the second set of copy commands.

6. The parallel processor of claim 4, wherein the host interface:
  determines that the page fault has been resolved; and
  in response, transmits the context load request to the copy engine.

7. The parallel processor of claim 4, wherein the context load request includes a channel identifier that identifies a channel that caused the page fault.

8. The parallel processor of claim 4, wherein the context load request includes a pointer to a memory location where the first set of copy commands is stored.

9. A computer-implemented method for resolving page faults generated by a copy engine, the method comprising:
  receiving a first copy operation included in a plurality of copy operations that includes a first set of copy commands;
  executing, by the copy engine, a first copy command included in the first set of copy commands that results in a page fault;
  storing the first set of copy commands to the memory including the first copy command that results in the page fault;
  after the page fault has been resolved, loading the first set of copy commands from the memory; and
  re-executing, by the copy engine, the first copy command.

10. The computer-implemented method of claim 9, further comprising:
  making a determination that a second copy operation received prior to the first copy operation is committed to complete; and
  in response to the determination, reporting the page fault to a host interface.

11. The computer-implemented method of claim 9, further comprising:
  receiving, from a host interface, a context load request associated with the first copy operation;
  wherein the first set of copy commands is loaded and the first copy command is re-executed in response to receiving the context load request.

12. The computer-implemented method of claim 11, wherein the first copy operation is associated with a first channel, and further comprising:
  receiving a second copy operation included in the plurality of copy operations that includes a second set of copy commands, wherein the second copy operation is associated with a second channel; and executing, by the copy engine, a second copy command included in the second set of copy commands.

13. The computer-implemented method of claim 11, wherein the host interface:
    determines that the page fault has been resolved; and
    in response, transmits the context load request to the copy engine.

14. The computer-implemented method of claim 11, wherein the context load request includes a channel identifier that identifies a channel that caused the page fault.

15. The computer-implemented method of claim 11, wherein the context load request includes a pointer to a memory location where the first set of copy commands is stored.

16. The computer-implemented method of claim 9, wherein the copy engine further receives, from a host interface, a plurality of copy operations that includes the first copy operation, wherein an original copy operation has been split by the host interface into the plurality of copy operations.

17. A computer-implemented method for resolving page faults generated by a copy engine, the method comprising:
    receiving a first copy operation included in a plurality of copy operations that includes a first set of copy commands;
    executing, by the copy engine, a first copy command included in the first set of copy commands;
    receiving an acknowledgement from a memory management unit indicating that the first copy command caused a page fault;
    storing the first set of copy commands to the memory including the first copy command that caused the page fault;
    after the page fault has been resolved, loading the first set of copy commands from the memory; and
    re-executing, by the copy engine, the first copy command.

18. The computer-implemented method of claim 17, further comprising receiving, from a host interface, a plurality of copy operations that includes the first copy operation, wherein an original copy operation has been split by the host interface into the plurality of copy operations.

19. The computer-implemented method of claim 17, wherein an original copy operation associated with a first memory range has been split into the plurality of copy operations, and each copy operation included in the plurality of copy operations is associated with a different memory range that is smaller than the first memory range.

20. The computer-implemented method of claim 17, further comprising:
    making a determination that a second copy operation that includes a second set of copy commands follows the first copy operation; and
    in response to the determination, storing the second set of copy commands to the memory.

* * * * *